United States Patent [19]

Bredenkamp

[11] 4,453,073

[45] Jun. 5, 1984

[54] HIGH FREQUENCY WELDING APPARATUS

[75] Inventor: Gordon L. Bredenkamp, Roodepoort, South Africa

[73] Assignee: Crucible Societe Anonyme, Luxembourg

[21] Appl. No.: 331,152

[22] Filed: Dec. 16, 1981

[30] Foreign Application Priority Data

Dec. 22, 1980 [ZA] South Africa ............... 80/7981

[51] Int. Cl.³ .............................................. B23K 9/10
[52] U.S. Cl. ................................... 219/130.1; 363/37
[58] Field of Search ............ 219/130.1, 130.21, 130.31, 219/130.32, 130.33, 130.51, 137 PS; 363/34, 37; 323/289

[56] References Cited

U.S. PATENT DOCUMENTS

| | | | |
|---|---|---|---|
| 3,728,516 | 4/1973 | Daspit | 219/130.33 |
| 3,973,165 | 8/1976 | Hester | 363/37 |
| 4,004,209 | 1/1977 | Lawson, Jr. | 363/37 |
| 4,048,468 | 9/1977 | Maule | 219/130.1 |
| 4,061,930 | 12/1977 | Nerem | 323/289 |
| 4,159,409 | 6/1979 | Hedberg | 219/130.21 |
| 4,201,906 | 5/1980 | Puschner | 219/130.33 |

FOREIGN PATENT DOCUMENTS

| | | | |
|---|---|---|---|
| 2325793 | 12/1974 | Fed. Rep. of Germany | 219/130.1 |
| 722494 | 1/1955 | United Kingdom . | |
| 1308695 | 2/1973 | United Kingdom . | |
| 1362163 | 7/1974 | United Kingdom . | |
| 1420319 | 1/1976 | United Kingdom . | |
| 1431379 | 4/1976 | United Kingdom . | |
| 1530906 | 11/1978 | United Kingdom . | |
| 1541068 | 2/1979 | United Kingdom . | |
| 2019135 | 10/1979 | United Kingdom . | |
| 1570614 | 7/1980 | United Kingdom . | |
| 2046537 | 11/1980 | United Kingdom . | |
| 1591185 | 6/1981 | United Kingdom . | |

*Primary Examiner*—C. C. Shaw
*Attorney, Agent, or Firm*—Brumbaugh, Graves, Donohue & Raymond

[57] ABSTRACT

Welding apparatus and a method of producing source of welding current. Use is made of an inverter supplied with direct current from a source to pulse a center-tapped primary winding of a transformer at a frequency in excess of the audio range of frequencies, typically 10 KHz to 20 KHz. A secondary winding of the transformer has output terminals for electrical connection to an electrode and work to be welded. The operation of the inverter is controlled by means of a feedback signal derived from a winding inductively coupled to the transformer.

The high operating frequency results in a significant reduction in the mass and dimensions of the welder compared to conventional welders which operate at mains frequencies.

2 Claims, 2 Drawing Figures

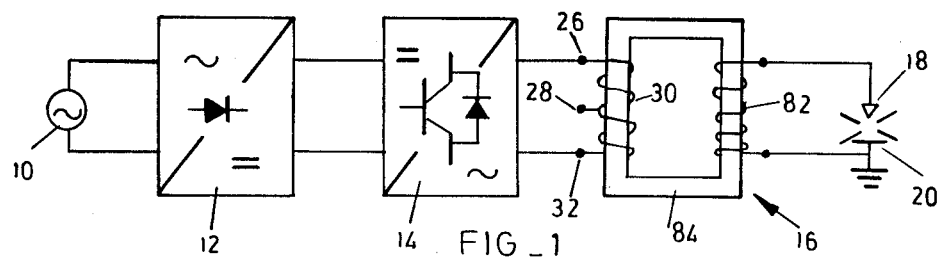
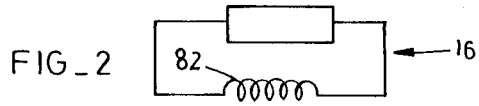
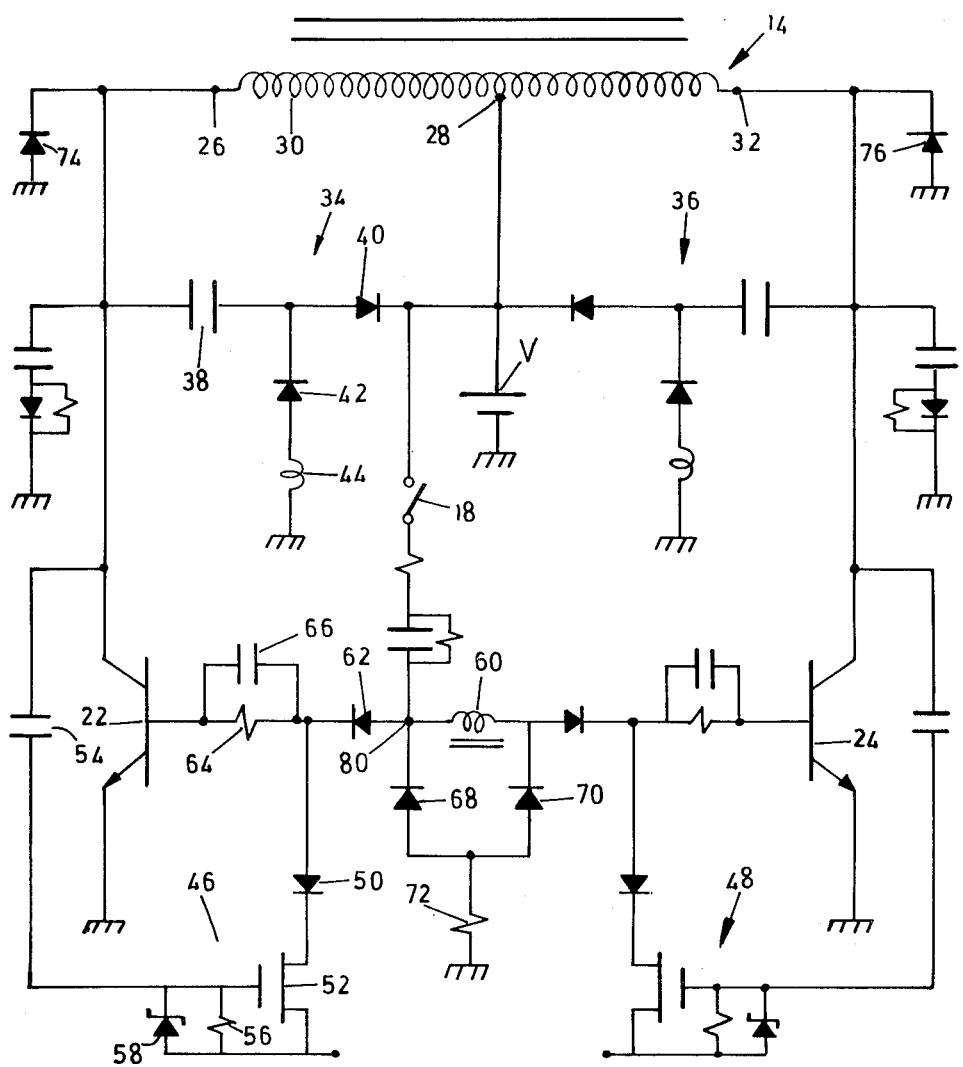

HIGH FREQUENCY WELDING APPARATUS

BACKGROUND OF THE INVENTION

This invention relates to electrical welders.

Arc welders are in widespread use, industrially and domestically. Such devices are powered by a single- or three-phase mains supply, or by a generating set or d.c. supply. Usually it is necessary to transform the supply voltage to a level suited for welding applications.

The welding transformers in use for this purpose are bulky and heavy and must either be tapped or be formed with a variable reactance core to provide a range of possible welding currents.

Various welders known to the applicant are described in the specifications of U.S.A. Pat. Nos. 3,211,953, 3,231,711, 3,304,485, 3,518,401, 3,818,177, 4,038,515, 4,047,096 and 4,117,303.

SUMMARY OF THE INVENTION

It is an object of the present invention to provide welding apparatus with a mass which is substantially lower than the mass of an equivalent welder powered from a conventional mains supply and with dimensions which are considerably smaller than the dimensions of a conventional welder.

The invention achieves this object by providing welding apparatus which comprises inverter means with an output frequency in excess of the audio range of frequencies, and a transformer, the transformer having a centre-tapped primary winding connected to the inverter means and a secondary winding with output terminals for electrical connection to an electrode and work to be welded.

The output frequency of the inverter is thus at least 3 KHz and preferably in the region of 15 KHz to 20 KHz. The mentioned upper frequency limits are manageable from the power switching point of view and are beyond the audio range of frequencies. However as suitable switching elements become available for incorporation in the inverter means it will be possible to work at frequencies considerably in excess of 20 KHz, e.g. of the order of 100 KHz or more. Working frequencies of this order are intended to fall within the scope of the invention.

The inverter means may be essentially of the free-running type and use may be made of feedback means for controlling the operation of the inverter means with a signal derived from the transformer.

In a preferred form of the invention the inverter means includes at least two transistors which are alternately turned on and the feedback means includes at least one winding which is inductively coupled to the transformer and which influences base current applied to the transistors.

The invention also extends to a method of producing a source of welding current which includes the steps of alternately connecting a direct current electrical source between a first terminal and a centre-tap, and between a second terminal and a centre-tap, respectively, of a centre-tapped primary winding of a transformer at a frequency in excess of 3 KHz, controlling the said connections by means of a feedback signal derived from the transformer, and connecting a secondary winding of the transformer to an electrode and work to be welded.

BRIEF DESCRIPTION OF THE DRAWINGS

The invention is further described by way of example with reference to the accompanying drawings in which:

FIG. 1 is a block diagram of a welder according to the invention, and

FIG. 2 is a circuit diagram of inverting and control circuits used in the welder of the invention.

DESCRIPTION OF PREFERRED EMBODIMENT

FIG. 1 illustrates, in block diagram form, the principle employed in the welder of the invention.

FIG. 1 illustrates an alternating power source 10 which is connected to a rectifier 12. The d.c. output of the rectifier is applied to a self-oscillating inverter 14. The inverter 14 has an output signal above the audio frequency range, typically in the region of from 15 to 20 KHz, which is substantially in excess of the conventional mains frequency of 50 Hz or 60 Hz. The output signal of the inverter is applied to a high frequency transformer 16. One output terminal of the transformer is connected to a welding electrode 18 while the other output terminal of the transformer is connected to a workpiece 20 which is to be welded.

The principal objective of the invention is to provide a welder of reduced mass and size and this is achieved by operating at comparatively high frequencies which in turn permits a corresponding reduction in transformer size. The transformer does not make use of conventional laminated metal cores but rather is based on the use of a soft magnetic ferrite core. This material is particularly suited to high frequency applications for it has a very high resistivity with the result that eddy currents can be practically ignored. The transformer is designed with adequate primary/secondary leakage reactance so that if its terminals are shortcircuited any current increase in the inverter takes place in a controlled manner and damage to the inverter is thereby averted.

FIG. 2 illustrates the circuit of the welder in more detail. It should be mentioned at this point that the circuitry of the rectifier 12 is substantially conventional and therefore it is not further illustrated in FIG. 2. FIG. 2 therefore illustrates in essence only the inverter 14 and the transformer 16.

The inverter employs two transistor switches each incorporating at least one transistor 22, 24 respectively, for alternately connecting the d.c. output signal, designated as V in FIG. 2, of the rectifier 12 between a first terminal 26 and a centre tap 28 of a primary winding 30 of the transformer 16, and between a second terminal 32 and the centre tap 28 of the primary winding, respectively.

Connected to the collector of each transistor are reactive snubbers designated generally by the reference numerals 34 and 36 respectively. Each snubber consists of a capacitor 38, diodes 40 and 42 respectively and an inductance 44. Networks 46 and 48 are connected between the base and collector of each of the transistors 22 and 24 respectively. Each network is designed to switch off the transistors rapidly, when appropriate, and consists of a diode 50, a field effect transistor 52, and a capacitor 54 in series connection with a resistor 56 and a zener diode 58 in parallel.

A base winding 60 is inductively coupled to the transformer 16. The winding 60 is connected to the base of each of the transistors 22 and 24 via a respective diode 62 and a resistor 64 and capacitor 66 in parallel. Diodes 68 and 70 respectively on either side of the base winding are connected via a resistance 72 to earth.

Free-wheeling diodes 74 and 76 are connected in anti-parallel to the transistors 22 and 24 respectively across the respective collector and emitters.

A switch 78 is connected between the d.c. supply voltage and a point 80 intermediate the base winding 60 and the transistor 22.

It should be pointed out that the inverter 14 is free running and that apart from the transistors 52 there are no active components in its control circuits. This simplifies the construction of the welder for very little is required in the way of auxiliary power supplies. On the other hand it has the consequence that the oscillating frequency of the inverter is load dependent and when an arc is struck during welding across the output terminals of the secondary winding of the transformer, designated 82 in FIG. 1, the output frequency changes. In general terms it may be said that the inverter oscillators at a characteristic frequency which is dependent on the primary voltage, the number of primary turns, the effective cross-sectional area of the soft ferrite core and on the saturation flux density of the core.

Oscillations are commenced by momentarily closing the switch 78. This drives the base voltage of the transistor 22 high and the collector current of the transistor increases. The resulting flow of current in the left hand half of the primary winding 30 induces a signal in the base winding 60 which then supplies base current to the transistor 22. The flux in the transformer core increases as the full voltage is impressed across the terminals 26 and 28. If maximum collector current is reached before the core saturates the collector/emitter voltage of the transistor 22 also increases. When it reaches a maximum value the polarity of the voltage across the base winding 60 reverses and the transistor 24 is turned on. Its collector/emitter voltage decreases until the diode 76 starts conducting and provides a path to earth for the collector current of the transistor 22. At this instant the collector/emitter voltage of the transistor 22 is 2 V. The transistor 24 then conducts and the process continues in the manner described.

The switching rate of the transistors 22 and 24 is designed to be in the region of from 15 to 20 KHz. At this frequency the magnetic components are as small as is practically possible and the circuitry for switching the welding currents, on the primary side of the transformer, is manageable and economical. This leads to a significant reduction in the dimensions and mass of the welding apparatus of the invention when compared to similar measures for a conventional welder operating at mains frequency. For example a welder constructed in accordance with the principles of the invention had a power output of up to 5 Kilowatts and a mass of only 5 Kilograms. The oscillation frequency of the inverter which, as already mentioned, is load dependent, varied from 10 to 20 KHz. The volume occupied by the welder was 220×150×150 mm.

The transformer is designed with a primary/secondary leakage reactance of a suitable value which minimises the likelihood of damage to the welder if the secondary winding is short circuited. Referring to FIG. 1 it can be seen that the primary winding 30, and the secondary winding 82, are located on opposing limbs of a rectangular soft ferrite core 84. The total leakage reactance is the sum of the leakage reactance arising from the spacing between the turns of the windings themselves, and the leakage reactance due to the spacing between the windings. The latter component is predetermined and designed by varying the dimensions of the transformer core.

As already mentioned use is made of reactive snubbers 34 and 36 to prevent the transistors from being exposed during switching to high driving peaks i.e. to limit dv/dt. The advantage of this type of snubber over the dissipating (RC) snubber is the higher efficiency of the former. Since the inverter is operating at ultra sonic frequencies dissipative snubbers are inherently inefficient leading to high energy losses. The reactive snubbers 34 and 36 are regenerative and return the excess energy to the supply V. The base currents of the transistors are supplied by the voltage induced in the base winding 60. It is known that the switch-off time of the transistors plays an important role in determining the switching losses and consequently it is desirable to keep the fall time of the collector currents as fast as possible. When each transistor is turned on it is driven into saturation and the circuits 46 and 48 are designed to sense when the respective transistors come out of saturation and at that instant to apply a negative potential to the base of the respective transistor to decrease its fall time. Thus referring for example to transistor 22 as the collector/emitter voltage begins rising a current flows through the capacitor 54 and clamps the gate/source voltage of the transistor 52 at the zener voltage of the diode 58. The transistor 52 is turned on and applies a negative potential connected to its source to the base of the transistor 22. This leads to a drastic reduction in the fall time of the transistor. The negative source voltage is easily derived by means of a simple auxiliary centre-tapped winding coupled to the transformer 16.

Clearly many other circuits could be devised to provide appropriate operating frequencies for the high frequency transformer 16. However the use of a free-running inverter of the type described has the particular advantages of simplicity and economy. The resulting welder is, as already mentioned, compact and of light weight. The actual welding current output by the transformer 16 is easily controlled by varying the base currents supplied to the transistors 22 and 24. This may be done for example by adjusting the values of the resistors 64, or 72, or both. Thus standard welding currents of say 40, 60, 80 and 100 amps can easily be selected for example by operating a switch which varies the value of one or more of these resistors in a predetermined and suitable manner.

The welder operates at frequencies which are above the audio range, usually in the ultrasonic range. Thus acoustic pollution is prevented. With the welder unit referred to previously no audible noise of any consequence was generated by the welder circuitry.

I claim:
1. A welding apparatus comprising:
   a transformer having a center-tapped primary winding and a secondary winding with output terminals for electrical connection to an electrode and work to be welded;
   means for applying a D.C. voltage to the center tap;
   at least two transistors whose collectors are respectively connected at opposite ends of the primary winding;
   a base winding inductively coupled to the transformer and interconnecting the bases of the transistors, so that the two transistors are alternately turned on and saturated; and switching means for alternatively applying a potential to the base of each transistors to alternatively turn each transistor off in response to its collector/emitter voltage reaching a predetermined voltage; wherein the switching means comprises an FET associated with each transistor, wherein each FET has its source terminal connected to the potential at its base of its associated transistor, its gate terminal connected through a capacitor to the collector of its associate transistor, and its drain terminal connected to the base of its associated transistor.

2. The welding apparatus according to claim 1 wherein the transistors are alternately turned on and off at a frequency of at least 15 KHz.

* * * * *